United States Patent [19]
Field

[11] 3,907,969

[45] Sept. 23, 1975

[54] SEPARATION OF $CO_2$ FROM GAS MIXTURES

[75] Inventor: Joseph H. Field, Pittsburgh, Pa.

[73] Assignee: The Benfield Corporation, Berwyn, Pa.

[22] Filed: June 28, 1974

[21] Appl. No.: 484,116

[52] U.S. Cl. ............. 423/223; 423/232; 252/192
[51] Int. Cl.² ............................ B01D 53/34
[58] Field of Search .......... 423/220, 223, 232, 233; 252/192

[56] References Cited
UNITED STATES PATENTS

| | | | |
|---|---|---|---|
| 3,181,929 | 5/1965 | Field et al. | 423/232 |
| 3,851,041 | 11/1974 | Eickmeyer | 423/223 |

*Primary Examiner*—Earl C. Thomas
*Attorney, Agent, or Firm*—William M. Epes

[57] ABSTRACT

An aqueous scrubbing solution for the separation of $CO_2$ from gas mixtures containing potassium carbonate as the principal component in which the absorption efficiency is enhanced by the presence of a sodium or potassium borate in an amount ranging from 2 to 15% by weight of equivalent $KBO_2$ and a sodium or potassium salt of a vanadium oxy acid in an amount ranging from 0.5 to 5% by weight of equivalent $V_2O_5$, and in which the weight ratio of equivalent $KBO_2$ to equivalent $V_2O_5$ is at least 1.5:1. The solution is resistant to oxidative degradation in the presence of oxygen-containing gases.

14 Claims, No Drawings

SEPARATION OF CO₂ FROM GAS MIXTURES

This invention relates to the removal of $CO_2$ from gas mixtures by means of aqueous solutions of potassium carbonate.

Aqueous potassium carbonate solutions are, of course, well known for the removal of $CO_2$ from gas mixtures. The most efficient processes employing aqueous potassium carbonate solutions, such as the type of process described in U.S. Pat. No. 2,886,405 of Homer E. Benson and Joseph H. Field, utilize the so-called hot absorption process where the bulk of the absorption takes place at elevated temperatures in the vicinity of the atmospheric boiling temperature of the solution. Through this technique, the heat losses normally encountered in heating and cooling the solution between the absorption and desorption steps (the latter normally being carried out by steam-stripping) are largely eliminated together with the elimination of expensive solution-to-solution heat exchangers.

Over the past several years, various additives for increasing the efficiency of potassium carbonate scrubbing processes have been suggested. One group of such additives which has the effect of improving both the absorption rate coefficient and the equilibria characteristics of the solution is the ethanolamines, particularly mono-, di-, and triethanolamine, as described in British Pat. No. 1,084,526. Other organic additives suggested for improving the absorption efficiency of potassium carbonate solutions include, for example, the amine borates as described in British Pat. No. 1,063,517 and amino acids as described, for example, in British Pat. No. 786,669.

In addition to the organic additives mentioned above, a number of inorganic salts have been suggested as additives for potassium carbonate solutions to improve absorption efficiency including, for example, arsenic trioxide ($As_2O_3$) as described in U.S. Pat. No. 3,037,844; alkali metal salts of selenius or tellurous acids as described in British Pat. No. 791,150; and alkali metal salts of weak inorganic acids such as potassium and sodium salts of boric acid, vanadic acid, arsenious acid and antimonious acid such as described in British Pat. No. 819,215. The use of small amounts of vanadium salts as additives for potassium carbonate solutions for corrosion inhibition has also been described in U.S. Pat. No. 3,181,929.

While some organic additives, particularly the ethanolamines, provide substantial improvements in overall absorption efficiency, they have the limitation that they are subject to oxidative degradation when exposed to oxidizers during the scrubbing operation. For example, in the removal of $CO_2$ from flue gases, the scrubbing solution is exposed to substantial amounts of oxygen present in the flue gas. Similarly, in the removal of $CO_2$ from recycle gases generated during the manufacture of ethylene oxide from ethylene and oxygen, the $CO_2$-containing recycle gas also contains substantial amounts of oxygen. The oxygen content of such gases reacts with and degrades organic activators, particularly when the absorption is carried out at elevated temperatures, causing the absorption solution to lose absorption efficiency and also tending to produce undesirable byproducts in the absorption solution.

In addition to the limitations in the type of gases that can be treated by potassium carbonate solutions containing organic additives, such solutions are subject to the further limitation that they cannot be regenerated by means of airstripping, again because of their susceptibility to oxidative degradation.

While many inorganic additives are not subject to the above limitations, they are subject to other disadvantages. For example, while the addition of arsenic ($As_2O_3$) to potassium carbonate solutions substantially improves the absorption efficiency, the arsenic must be employed in relatively high concentrations, such as 10 to 15% by weight, which produces a highly toxic solution creating operating personnel hazards and environmental pollution problems.

Many of the other inorganic additives that have been proposed, such as vanadium salts and borate salts, have proven to provide only relatively small improvements in overall absorption efficiency compared to the marked improvements in absorption efficiency obtained with organic additives, particularly the ethanolamines.

It has now been found, in accordance with this invention, that the overall efficiency of potassium carbonate solutions for the absorption of $CO_2$ may be markedly improved by the presence in the scrubbing solution of a small amount of a mixture of sodium or potassium borate and a sodium or potassium salt of a vanadium oxy acid. While neither the borate salt nor the vanadium salt alone significantly improves the overall absorption preformance of the solution regardless of the amounts employed, the combination of these two salts in the proper proportions results in a marked overall increase in absorption efficiency. Absorption efficiencies similar to those obtained with organic additives such as ethanolamines can be achieved with the very important additional advantage that these inorganic salt additives are not subject to oxidative deterioration when exposed to oxygen-containing gases.

The new scrubbing solution of the invention employs potassium carbonate as the principal component in concentrations ranging from 15 to 40% by weight and preferably from 20 to 35% by weight of $K_2CO_3$. An actual operating solution used for $CO_2$ absorption is, of course, a mixture of potassium carbonate and potassium bicarbonate, and the above weight percent values express the concentration of carbonate on the assumption that all carbonate is present as $K_2CO_3$. For example, on this assumption, an operating solution actually containing 15% by weight of $K_2CO_3$ and 14.47% by weight of $KHCO_3$ would be defined as containing 25% $K_2CO_3$.

The effective amount of the sodium or potassium borate in the scrubbing solution ranges from about 2 to 15% by weight of equivalent $KBO_2$; that is, the concentration of sodium or potassium borate in the solution should be in an amount which is chemically equivalent to from 2 to 15% by weight of $KBO_2$ based on the total weight of the solution. The preferred concentration of the borate salt is from 4 to 10% by weight of equivalent $KBO_2$. The sodium and potassium borate salts exist in a variety of forms such as potassium metaborate, $K_2B_2O_4$; potassium tetraborate octahydrate, $K_2B_4O_7 \cdot 8H_2O$; sodium metaborate, $Na_2B_2O_4$; sodium metaborate tetrahydrate, $Na_2B_2O_4 \cdot 4H_2O$; sodium tetraborate, $Na_2B_4O_7$; sodium tetraborate pentahydrate, $Na_2B_4O_7 \cdot 5H_2O$; and sodium tetraborate decahydrate (borax), $Na_2B_4O_7 \cdot 10H_2O$. While it is not known with certainty in what form the borate exists when dissolved in the scrubbing solution, it is assumed for the purpose of defining the concentration of the borate salt in the solution that it exists in the simple form $ABO_2$ where A is the potassium or sodium atom and, as pointed out above, the concentration is expressed in terms of equivalent $KBO_2$. Thus, the addition of 4% by weight of $K_2B_2O_4$ to the solution is defined as providing 4% by weight of equivalent $KBO_2$. Similarly, the addition of 5.98% by weight of a mixture of potassium tetraborate pentahydrate, $K_2B_4O_7 \cdot 8H_2O$ and KOH in a molar ratio of $K_2B_4O_7 \cdot 8H_2O$:KOH of 1:2 is defined as providing 4.0% by weight of equivalent $KBO_2$ on the assumption that in solution:

$$K_2B_4O_7 \cdot 8H_2O + 2KOH \rightarrow 4KBO_2 + 9H_2O$$

In the same way, the addition of 3.22% by weight of sodium metaborate, $Na_2B_2O_4$, is defined as providing 4.0% by weight of equivalent $KBO_2$. The addition of 4.54% by weight of a mixture of sodium tetraborate pentahydrate, $Na_2B_4O_7 \cdot 5H_2O$, and NaOH in a molar ratio of $Na_2B_4O_7 \cdot 5H_2O$:NaOH of 1:2 is defined as providing 4% by weight of equivalent $KBO_2$ (assuming the same type of stoichiometry as shown above).

The preferred borate is potassium borate. A convenient procedure for adding the potassium borate to the potassium carbonate scrubbing solution is by simply adding boric acid whereupon the boric acid is assumed to be converted to potassium borate $KBO_2$ in accordance with the following:

$$2H_3BO_3 + K_2CO_3 \rightarrow 2KBO_2 + CO_2 + 3H_2O$$

In this event, of course, the potassium carbonate content of the solution must be properly adjusted to compensate for that consumed by reaction with the added boric acid. Alternatively, the $KBO_2$ may be preformed, e.g., by preparing a mixture of boric acid and $K_2CO_3$ or boric acid and KOH.

The effective amount of the sodium or potassium salt of the vanadium oxy acid in the scrubbing solution ranges from about 0.5 to 5% by weight of equivalent $V_2O_5$; that is, the concentration of the vanadium salt in the solution should be in an amount which is chemically equivalent to from 0.5 to 5% by weight of $V_2O_5$ based on the total weight of the solution. The preferred concentration of the vanadium salt is from .8 to 3% by weight of equivalent $V_2O_5$. The vanadium oxy acids exist in various forms, the most common of which are metavanadic acid, $HVO_3$, and pyrovanadic acid $H_4V_2O_7$. Any of the sodium or potassium salts of the various vanadium oxy acids may be employed, particularly the potassium or sodium vanadates, such as potassium metavanadate, $KVO_3$; potassium pyrovanadate, $K_4V_2O_7$; sodium metavanadate, $NaVO_3$; or sodium pyrovanadate, $Na_4V_2O_7$. Such sodium or potassium salts may be added to the potassium carbonate scrubbing solution as such or formed in situ by adding a vanadium oxide soluble in aqueous potassium carbonate whereupon the vanadium salt forms by reaction of the oxide with potassium cabonate. For example, when adding $V_2O_5$ to a potassium carbonate solution, potassium vanadate forms as follows:

$$K_2CO_3 + V_2O_5 \rightarrow 2 KVO_3 + CO_2$$

Also, the vanadium salt can be formed by adding ammonium vanadate, $NH_4VO_3$, whereupon potassium vanadate forms by reaction with potassium carbonate:

$$K_2CO_3 + 2NH_4VO_3 \rightarrow 2 KVO_3 + (NH_4)_2CO_3$$

The exact form in which the vanadium salts exist in the scrubbing solution under operating conditions is not known with certainty. There is evidence, for example, that under some circumstances they may exist in several valence forms such as the pentavalent form, e.g., potassium metavanadate, $KVO_3$, or other lower valence forms such as the tetravalent or trivalent forms or mixtures of various valence forms.

As pointed out above, for the purpose of defining the concentration of the vanadium salt in the solution, the concentration is expressed in terms of equivalent $V_2O_5$. Thus, the addition of 1% by weight of $V_2O_5$ to the solution is defined as providing 1% by weight of equivalent $V_2O_5$. Similarly, the addition of 1.52% $KVO_3$ or 1.34% $NaVO_3$ to the solution is defined as providing 1% by weight of equivalent $V_2O_5$.

In addition to controlling the amounts of the borate and vanadium salts as stated above, it is also necessary in order to obtain the advantage of markedly enhanced overall absorption efficiency, to employ these salts in the proper relative proportions. The weight ratio of equivalent $KBO_2$ to equivalent $V_2O_5$ in the scrubbing solution should be at least about 1.5:1 and preferably at least about 2.5:1. While the upper limit of this weight ratio is not as critical as the lower limit, the weight ratio of equivalent $KBO_2$ to equivalent $V_2O_5$ should generally not exceed about 15:1 and is preferably in the range of from 2.5:1 to 10:1.

As stated above and as will be illustrated by the examples which follow, the simultaneous presence of both the borate and the vanadium salts in the potassium carbonate scrubbing solution, provided they are employed in the proper proportions, produces an overall absorption efficiency which neither of these salts provide by themselves when used alone.

Overall absorption efficiency in a $CO_2$ liquid absorbent system is a function of both the absorption rate coefficient and the overall $CO_2$ pickup per volume of solution. The absorption rate coefficient is in general terms a measure of the velocity of absorption and may be expressed, for example, in terms of cubic feet of $CO_2$ absorbed per hour per unit volume of solution per unit driving force, the driving force being, of course, the differential between the partial pressure of $CO_2$ in the gas phase and the equilibrium back pressure of $CO_2$ from the solution. The overall $CO_2$ pickup is in general a measure of the amount of $CO_2$ absorbed per unit volume of solution per absorption cycle, such as the cubic feet of $CO_2$ absorbed per gallon of solution as the solution passes through an absorption column at a given set of conditions. The overall $CO_2$ pickup is in large measure a function of the equilibrium characteristics of the solution, i.e., the manner in which the equilibrium back pressure of the $CO_2$ from the solution varies with the $CO_2$ loading in the solution.

In an absorption solution of high overall efficiency, both of these factors (i.e., absorption rate coefficient and overall $CO_2$ pickup) are at a relatively high level. Thus, increasing the absorption rate coefficient at the expense of overall $CO_2$ pickup or, conversely, increasing the overall $CO_2$ pickup at the expense of the absorption rate coefficient may actually result in a solution of overall lower absorption efficiency.

In the course of the investigations leading to this invention, it was found that, while addition of the borate salts to a potassium carbonate scrubbing solution may have a favorable effect on the overall $CO_2$ pickup, the absorption rate coefficient is adversely affected when used in sufficient quantities to substantially improve the overall $CO_2$ pickup with the result that little or no significant improvement in overall absorption efficiency is obtained. It was further found that, while the addition of vanadium salts to a potassium carbonate scrubbing solution has a favorable effect on the absorption rate coefficient, such additions have a highly unfavorable effect on the overall $CO_2$ pickup with the result that overall absorption efficiency is often substantially reduced. Despite these adverse indications, it was discovered in accordance with the invention that the combination of these two salts, when added to potassium carbonate solutions in the proper amounts and in the proper relative proportions, produces a scrubbing solution with the desired substantial improvement in both absorption rate coefficient and overall $CO_2$ pickup. The relative behavior of the individual salts and the combination of the salts in the proper proportions is illustrated in the examples which follow.

EXAMPLES

In order or compare results on the same basis, the following runs were all conducted using an aqueous solution containing 25% by weight of potassium carbonate. The borate, where used, was added as $KBO_2$ prepared by reacting boric acid with KOH. The vanadium salt, where used, was present in the form of $KVO_3$ and the weight of the $KVO_3$ is expressed as equivalent % $V_2O_5$ in the following tables. For example, 1% $V_2O_5$ as shown in the tables below corresponds to 1.52% $KVO_3$. Using the solutions of the composition indicated, the absorption rate of $CO_2$ in the solution at an equilibrium back pressure equal to 4 pounds per square inch (psi) of $CO_2$ and at a temperature of 110°C was measured and expressed in the following table under "Rate" as cubic feet of $CO_2$ absorbed per hour per liter of solution per atmosphere of driving force. The rate was measured at an equilibrium back pressure of 4 psi since this is typical of conditions existing near the top of an absorption column in a typical commercial $CO_2$ scrubbing unit. At the top portion of the absorber where the driving forces are at their lowest, it is particularly important that the rate coefficient be high. The overall $CO_2$ pickup (shown as "Pickup" in the following tables and expressed as cubic feet of $CO_2$ absorbed per gallon of solution) was measured at 110°C for each solution as the difference in the $CO_2$ content of the solution at equilibrium (in cubic feet per gallon) as the equilibrium $CO_2$ partial pressure over the solution varies between the limits of 4 pounds per square inch and 25 pounds per square inch, such values being typical of those encountered in commercial operation of $Co_2$ removal units. Run A (a solution containing only 25% by weight of potassium carbonate) provides a standard basis for comparison of the behavior of the various solutions. The tables below show the % changes in the rate and pickup respectively for each of the borate and/or vanadium salt-containing solutions as compared to the control run, i.e., Run A.

The results of Runs A through D, where solutions containing varying amounts of the borate salt only are compared to the control Run A, are shown in Table I below:

TABLE I

| Run | % $K_2CO_3$ | % $KBO_2$ | % $V_2O_5$ | Rate | Pickup | % Rate Change | % Pickup Change |
|---|---|---|---|---|---|---|---|
| A | 25 | 0 | 0 | 4.12 | 2.14 | — | — |
| B | 25 | 1 | 0 | 4.21 | 2.05 | +2.3 | −4.2 |
| C | 25 | 5 | 0 | 4.36 | 2.29 | +5.7 | +7.1 |
| D | 25 | 10 | 0 | 3.88 | 2.83 | −5.8 | ±31.9 |

As shown by the data in Table I, the addition of the borate salt alone in amounts up to 5% produced negative or only negligible increases in the rate and pickup. While the addition of 10% by weight of the borate salt produces a substantial improvement in the pickup, the rate, instead of increasing, was adversely affected.

In Table II below, the results of Runs E through G, wherein only the vanadate salt was added in amounts ranging from 1% to 5%, is compared to the results obtained in the control Run A:

TABLE II

| Run | % $K_2CO_3$ | % $KBO_2$ | % $V_2O_5$ | Rate | Pickup | % Rate Change | % Pickup Change |
|---|---|---|---|---|---|---|---|
| A | 25 | 0 | 0 | 4.12 | 2.14 | — | — |
| E | 25 | 0 | 1 | 4.77 | 1.71 | +15.6 | −19.9 |
| F | 25 | 0 | 3 | 6.20 | 1.74 | +50.4 | −18.9 |
| G | 25 | 0 | 5 | 6.19 | 1.45 | +50.2 | −32.5 |

As shown in Table II, the addition of the vanadium salt alone substantially increases the rate coefficient but at the expense of a highly adverse effect on the pickup. As a result of the sharp drop in the pickup, the overall absorption efficiency of the solution is adversely rather than favorably affected.

In Table III below, the results of Runs H through O, in which both the borate and vanadium salts were employed in the amounts and relative proportions as previously defined, are shown as compared to control Run A containing neither of these salts:

TABLE III

| Run | % $K_2CO_3$ | % $KBO_2$ | % $V_2O_5$ | Rate | Pickup | % Rate Change | % Pickup Change |
|---|---|---|---|---|---|---|---|
| A | 25 | 0 | 0 | 4.12 | 2.14 | — | — |
| H | 25 | 4 | 1 | 5.45 | 2.31 | +32.0 | +8.0 |
| I | 25 | 10 | 1 | 4.90 | 2.50 | +18.4 | +16.7 |
| J | 25 | 6 | 1.5 | 5.47 | 2.36 | +32.6 | +16.7 |
| K | 25 | 8 | 1.5 | 4.86 | 3.14 | +17.8 | +46.7 |
| L | 25 | 6 | 2 | 5.50 | 2.89 | +33.3 | +34.6 |
| M | 25 | 7 | 2 | 4.80 | 2.92 | +16.2 | +36.3 |
| N | 25 | 10 | 2 | 4.83 | 3.34 | +17.0 | +56.0 |
| O | 25 | 8 | 3 | 4.98 | 2.54 | +20.8 | +18.3 |

As shown by the data in Table III, the use of both the borate and vanadium salts in the proper amounts and proportions produces a substantial increase in both the rate coefficient and the $CO_2$ pickup, as distinguished from an increase in one at the expense of the other. As a result of the simultaneous enhancement of both of these factors, the solution carrying capacity (which is generally proportional to pickup), the rate coefficient and the overall rate (which is dependent upon both rate coefficient and overall pickup) are simultaneously improved, resulting in a marked improvement in overall efficiency, not attainable with the use of the individual salts.

In Table IV, Runs P through R show the results obtained with solutions in which the weight proportion of borate salt is substantially lower than, or only slightly lower than, the weight proportion of the vanadium salt, as compared to the results obtained in control Run A:

TABLE IV

| Run | % $K_2CO_3$ | % $KBO_2$ | % $V_2O_5$ | Rate | Pickup | % Rate Change | % Pickup Change |
|-----|-------------|-----------|------------|------|--------|---------------|-----------------|
| A | 25 | 0 | 0 | 4.12 | 2.14 | — | — |
| P | 25 | 1 | 2 | 5.28 | 1.73 | +38.0 | −19.0 |
| Q | 25 | 2 | 3 | 6.42 | 1.78 | +55.8 | −16.7 |
| R | 25 | 4 | 5 | 6.59 | 1.87 | +59.7 | −12.5 |

As shown by the data in Table IV, the use of the two salts in combination, wherein the relative weight ratios of the two salts are not properly selected, fails to produce the desired simultaneous enhancement of both rate coefficient and overall pickup. Note that, in Runs P, Q and R where the weight ratios of equivalent $KBO_2$ to equivalent $V_2O_5$ are 1:2, 2:3, and 4:5 respectively, there is a sharp decline rather than an enhancement of the overall pickup with the result that the overall absorption efficiency declines or undergoes little significant improvement.

The new absorption solution of the invention may be used in any desired absorption cycle. For most applications, of course, the solution will be employed in the usual continuous cycle in which absorption takes place in an absorption column, preferably with the $CO_2$-containing gas moving countercurrent to the solution, and in which the stripping takes place in a stripping tower where the absorbed $CO_2$ is stripped from the solution, with the solution being continuously circulated between the absorption and regeneration stages. The absorption and stripping towers are, of course, provided with the usual packings or plates to insure intimate gas-liquid contact during the absorption and stripping operation.

One particularly preferred type of cycle is that described in U.S. Pat. No. 2,886,405 of Homer Benson and Joseph Field wherein at least the bulk of the absorption takes place at a temperature in the vicinity of the atmospheric boiling temperature of the solution under superatmospheric pressure and where the solution is regenerated by steam-stripping at a reduced pressure in the vicinity of atmospheric. In this cycle, at least the bulk of the absorption takes place at approximately the same temperature as the stripping such that the operation is largely isothermal in nature with a sharply reduced amount of heating and cooling between the absorption and regeneration stage. In such a cycle, as pointed out in U.S. Pat. 2,886,405, it is often desirable to cool a relatively minor portion of the solution that is introduced into the top of the absorption column, particularly when it is desired to reduce the $CO_2$ content of the purified gas to a low level such as 500 to 1500 ppm.

In some applications, on the other hand, it may be desirable to operate the absorption stage at a considerably lower temperature than the regeneration stage in which case it will be desirable to heat-exchange the relatively cool solution leaving the absorber with the hot solution leaving the bottom of the regenerator to minimize heat losses.

While steam will be the preferred stripping medium in the regeneration stage to remove absorbed $CO_2$ from the solution, an important advantage of the present invention is that the inorganic borate and vanadium salts employed are resistant to oxidative deterioration and accordingly air-stripping may be employed in cases where the overall economics of the system for the particular applications favor air as the stripping medium.

The above brief description of the various cycles in which the scrubbing solution of the invention may be employed is intended to be illustrative and other types of absorption cycles in addition to those specifically mentioned may also be employed. Other illustrative examples of cycles in which the solution of the invention may be employed as those, for example, described in U.S. Pat. No. 3,563,695 of Homer E. Benson, U.S. Pat. No. 3,563,696 of Homer E. Benson, and U.S. Pat. No. 3,642,430 of Homer E. Benson.

While the new scrubbing solutions of the invention are useful primarily for the removal of $CO_2$ from $CO_2$-containing gases, the $CO_2$-containing gases may also contain other contaminants that may be wholly or partially removed by the new scrubbing solution. Such gases may include, for example, $H_2S$, COS, mercaptans and organic sulfides. In some cases, the solution of the invention may not be entirely suitable for the scrubbing of gases containing large amounts of $H_2S$ in that there may be some reaction between substantial amounts of $H_2S$ and the vanadium salts, producing insoluble precipitates in the solution and producing a continuous consumption of the vanadium salts.

The scrubbing solution of the invention will find particularly valuable applications in the scrubbing of $CO_2$-containing gas mixtures which also contain amounts of oxygen sufficient to cause oxidative deterioration of organic additives. As little oxygen as that corresponding to an oxygen partial pressure of 0.2 pound per square inch is sufficient to cause relatively rapid oxidation of many organic additives such as the ethanolamines. For example, potassium carbonate scrubbing solutions are extensively used for the removal of $CO_2$ from recycle gases produced in the production of ethylene oxide by the catalytic oxidation of ethylene. Such recycle gases contain of the order of 2% to 5% of oxygen in addition to e.g., 8% $Co_2$. In the treatment of such gases with potassium carbonate solutions containing organic additives, particularly when the hot absorption cycle is employed, the organic additives such as ethanolamines are rapidly oxidized, rendering them inactive and producing undesired degradation products in the solution. The mixture of borate salts and vanadium salts employed in accordance with the invention are resistant to such oxidative deterioration and provide a marked enhancement of the overall absorption efficiency similar to that obtained by the use of the organic additives. A still further advantage of the scrubbing solution of the invention is that all components have zero volatility in contrast to solutions containing organic additives. This eliminates volatility losses as well as avoiding contamination of the purified gas and/or the recovered $CO_2$.

Another particularly valuable application for the new scrubbing solutions of the invention is the treatment of oxygen-containing flue gases for the recovery of $CO_2$. Typically, such gases may contain of the order of 10% of $CO_2$ together with from 1% to 5% of oxygen.

Along with the borate and vanadium salts, other additives may also be employed in the scrubbing solutions of the invention such as defoaming agents where necessary, and corrosion inhibitors. Generally, however, for the great majority of applications, the vanadium salt in the concentrations defined will provide excellent corrosion inhibition permitting the use of carbon steel throughout most of the scrubbing system and the use of auxiliary corrosion inhibitors will not be necessary.

I claim:

1. An aqueous solution for absorbing $CO_2$ from gas mixtures containing from 15 to 40% by weight of potassium carbonate, from 2 to 15% by weight of equivalent $KBO_2$, from 0.5 to 5% by weight of equivalent $V_2O_5$, and in which the weight ratio of equivalent $KBO_2$ to equivalent $V_2O_5$ is at least 1.5:1.

2. A solution in accordance with claim 1 in which the concentration of equivalent $KBO_2$ is from 4 to 10%.

3. A solution in accordance with claim 1 in which the concentration of equivalent $V_2O_5$ is from 0.8 to 3%.

4. A solution in accordance with claim 1 in which the weight ratio of equivalent $KBO_2$ to equivalent $V_2O_5$ is at least 2.5:1.

5. A solution in accordance with claim 1 in which the potassium carbonate concentration ranges from 20 to 35%.

6. An aqueous solution for absorbing $CO_2$ from gas mixtures containing from 20 to 35% by weight of potassium carbonate, from 4 to 10% by weight of equivalent $KBO_2$, from 0.8 to 3% by weight of equivalent $V_2O_5$, and in which the weight ratio of equivalent $KBO_2$ to equivalent $V_2O_5$ is at least 2.5:1.

7. A method of absorbing $CO_2$ from gas mixtures comprising the steps of contacting such gas mixtures with an aqueous solution which contains from 15 to 40% by weight of potassium carbonate, from 2 to 15% by weight of equivalent $KBO_2$, from 0.5 to 5% by weight of equivalent $V_2O_5$, and in which the weight ratio of equivalent $KBO_2$ to equivalent $V_2O_5$ is at least 1.5:1.

8. A method of absorbing $CO_2$ from gas mixtures in accordance with claim 7 in which the concentration of equivalent $KBO_2$ ranges from 4 to 10%.

9. A method in accordance with claim 7 in which the concentration of equivalent $V_2O_5$ ranges from 0.8 to 3%.

10. A method in accordance with claim 7 in which the weight ratio of equivalent $KBO_2$ to equivalent $V_2O_5$ is at least 2.5:1.

11. A method in accordance with claim 7 in which the concentration of potassium carbonate ranges from 20 to 35% by weight.

12. A method in accordance with claim 7 in which a continuous absorption cycle is employed including an absorption stage and a regeneration stage in which the absorption is carried out at a superatmospheric pressure, and in which the regeneration takes place by steam-stripping at a reduced pressure, and in which at least the major portion of the absorption takes place at approximately the same temperature as the steam-stripping step.

13. A method in accordance with claim 7 in which the $CO_2$-containing gas mixture also contains a concentration of oxygen sufficient to cause oxidative deterioration of organic additives.

14. A method of absorbing $CO_2$ from gas mixtures comprising the steps of contacting such gas mixtures with an aqueous solution which contains from 20 to 35% by weight of potassium carbonate, from 4 to 10% by weight of equivalent $KBO_2$, from 0.8 to 3% by weight of equivalent $V_2O_5$, and in which the weight ratio of equivalent $KBO_2$ to equivalent $V_2O_5$ is at least 2.5:1.

* * * * *